(12) United States Patent
Jarvis et al.

(10) Patent No.: US 7,095,908 B2
(45) Date of Patent: Aug. 22, 2006

(54) METHOD AND SYSTEM FOR INFORMATION HANDLING SYSTEM CUSTOM IMAGE MANUFACTURE

(75) Inventors: Marc Everett Andrew Jarvis, Belton, TX (US); Kevin Lee Hanes, Round Rock, TX (US); Jefferson Watts Raloy, Austin, TX (US); Kent William Nagase, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 746 days.

(21) Appl. No.: 10/292,035

(22) Filed: Nov. 12, 2002

(65) Prior Publication Data

US 2004/0093283 A1 May 13, 2004

(51) Int. Cl.
*G06K 9/60* (2006.01)
*G06F 9/445* (2006.01)

(52) U.S. Cl. .................................. 382/305; 717/174

(58) Field of Classification Search ............ 382/284, 382/312, 305; 705/27; 717/174–175, 121; 726/29, 24; 700/103
See application file for complete search history.

(56) References Cited

U.S. PATENT DOCUMENTS

| | | | |
|---|---|---|---|
| 5,894,571 A | 4/1999 | O'Connor | 395/652 |
| 6,009,406 A | 12/1999 | Nick | 705/10 |
| 6,236,901 B1 | 5/2001 | Goss | 700/95 |
| 6,298,443 B1 * | 10/2001 | Colligan et al. | 726/29 |
| 6,543,047 B1 * | 4/2003 | Vrhel et al. | 717/121 |
| 6,598,223 B1 * | 7/2003 | Vrhel et al. | 717/174 |
| 6,715,144 B1 * | 3/2004 | Daynes et al. | 717/174 |
| 6,760,708 B1 * | 7/2004 | Hubbard et al. | 705/27 |
| 6,928,644 B1 * | 8/2005 | Kroening et al. | 717/175 |

* cited by examiner

*Primary Examiner*—Kanjibhai Patel
(74) *Attorney, Agent, or Firm*—Hamilton & Terrile, LLP; Robert W. Holland

(57) ABSTRACT

A custom image processing system and method automatically verifies the validity of custom images for manufacture of information handling systems by electronically analyzing the custom image to determine its base hardware configuration, to confirm its proper configuration, and to confirm its compatibility with ordered information handling systems. Upon verification of the custom image, an automatically generated production image and customization scripts are provided to a burn rack to manufacture the information handling systems with the custom image and a desired customization level.

20 Claims, 2 Drawing Sheets

METHOD AND SYSTEM FOR INFORMATION HANDLING SYSTEM CUSTOM IMAGE MANUFACTURE

BACKGROUND OF THE INVENTION

1. Field of the Invention

The present invention relates in general to the field of manufacturing information handling systems, and more particularly to a method and system for manufacturing information handling systems according to custom image orders.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The large variety of hardware and software configurations available for information handling systems often presents a logistical problem to businesses that use a large number of information handling systems. Information technology administrators often try to reduce the variety of information handling systems by standardizing as much as possible the hardware and software for a business or business unit's information handling systems. One way for information technology administrators to achieve standardization is to place large orders for custom manufactured information handling systems. Hardware standardization is generally realized by placing the order with a single manufacturer and specifying the components used to build the information handling systems. Software standardization is more difficult to realize since software applications often allow users to set up various options during installation. One way for information technology administrators to standardize software configurations is too install desired software onto an information handling system hard disk drive and then send the hard disk drive to the manufacturer to use the image on the hard disk drive for the manufacture of custom ordered information handling systems.

Although information handling system burn racks are able to load images onto manufactured information handling systems, custom images delivered on hard disk drives are not typically capable of direct transfer to a factory work flow process. Generally, custom images received on hard disk drives are manually validated and prepared for use in the factory work flow process. For instance, an engineer typically loads the custom image onto a test information handling system having the custom ordered hardware configuration to verify the validity of the custom image, such as the compatibility of the custom image with the hardware configuration. The manual verification process is time intensive and prone to errors. For instance, the engineer typically must build the test unit to the custom order specification, run tests on the unit to ensure proper operation of the test unit, and alter the software configuration in the event of any detected failures, a process that may take weeks. Errors in the building of the test information handling system, errors or incompleteness in the test verification process and errors in the alteration of the software configuration may delay custom order production or result in the shipment of inoperative units.

SUMMARY OF THE INVENTION

Therefore a need has arisen for a method and system which automates custom image validation for integration of the custom image into an information handling system production work flow process.

In accordance with the present invention, a method and system are provided which substantially reduce the disadvantages and problems associated with previous methods and systems for preparing a custom image for use in the production of information handling systems. An analyzing engine automatically generates a production image and customization scripts to integrate the manufacturing of information handling systems with a custom image into a manufacturing work flow process. The analyzing engine analyzes an image to determine a custom image hardware configuration base and compares the determined base against ordered information handlings to validate a custom image for production.

More specifically, a custom image processing system includes an order engine to accept orders for information handling systems having custom images and an analyzing engine for automatically analyzing a custom image to validate the image for production at a desired level of customization for each information handling system. The order engine interfaces with a hard disk drive to receive a custom image and check the image's integrity, and also accepts customization information for orders to manufacture information handling systems with the custom image. The analyzing engine receives the custom image and customization information from the order engine to verify the validity of the custom image and to prepare a production image and scripts for manufacture of information handling systems. A configuration module of the analyzing engine electronically determines the base hardware configuration of the information handling system that generated the custom image and checks the custom image to ensure that no misconfigurations exist. A verification module compares the base hardware configuration with ordered configurations to ensure compatibility of the custom image with the information handling systems manufactured to accept the custom image. A customization settings module determines the level of customization settings for each image of a manufactured information handling system. Once a custom image is verified and customization level set, a production module generates a production image for use by a burn rack and a manufacturing script module generates scripts to ensure proper customization level settings for manufactured information handling systems.

The present invention provides a number of important technical advantages. One example of an important technical advantage is the automation of custom image validation for the integration of a custom image into an information handling system production work flow process. Automated validation of a custom image reduces the time needed to bring a custom image into production by removing manual validation by engineers. For instance, a custom image is validated without building a physical information handling system to load and run the custom image. The compatibility of the custom image with associated orders for information handling systems is validated by automatically determining the hardware configuration base that generated the custom image and comparing the base with custom order hardware configuration. Misconfigurations of the custom image for the hardware configuration base are automatically detected and sent out of the automation for correction. Different levels of customization for information handling systems is supported by customization scripts that are automatically generated based on the customization level of the order for the information handling systems. Automation of custom image processing for production of custom ordered information handling systems substantially reduces the time that elapses from the time a custom image is received until the custom image can be ordered.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Custom images for information handling systems are automatically verified for production of customized information handling systems by electronically analyzing an ordered custom image. Electronic analysis reduces or eliminates the need to build and test an information handling system of the ordered configuration, thus reducing the time, expense and risk of errors in processing a custom image for production of information handling systems. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
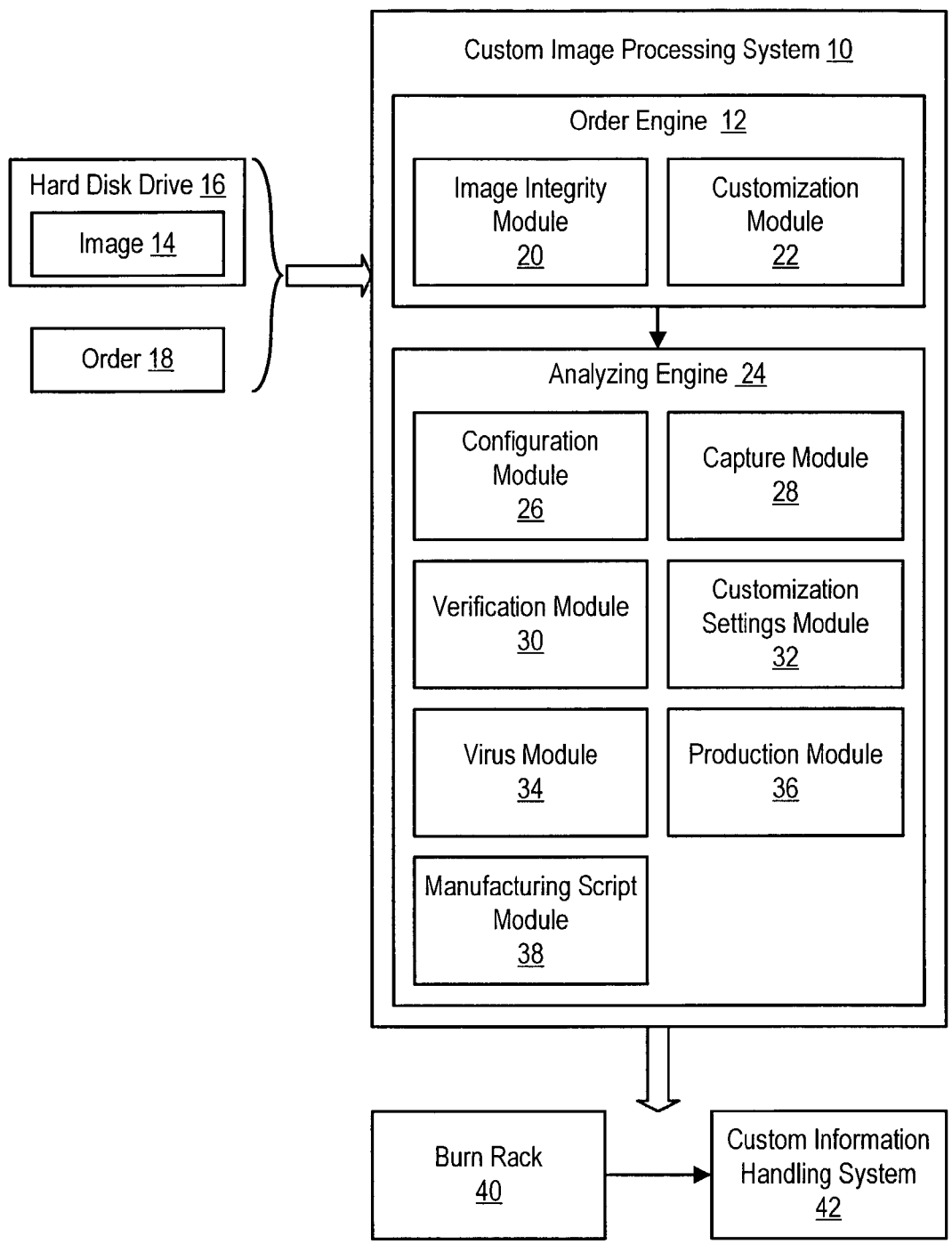
FIG. 1 depicts a block diagram of a custom image processing system.

Referring now to FIG. 1, a block diagram depicts a custom image processing system 10 for receiving custom image orders and automatically processing the custom image orders to generate production images on manufactured information handling systems. An order engine 12 accepts an image 14, such as by interfacing with a hard disk drive 16, and an order 18 that specifies the customer requirements and hardware configuration information of the ordered information handling systems. For example, a customer configures an information handling system to the customer's desired specification on a hard disk drive 16 and then sends the hard disk drive to the manufacturer along with an order 18 to load the image 14 of the hard disk drive on information handling systems having predetermined hardware configurations. An image integrity module 20 of order engine 12 interacts with hard disk drive 16 to check that the integrity of image was not damaged in shipping, such as with lost sectors. A customization module 22 of order engine 12 accepts customization information from order 18 or from a user interface in order to set the level of customization for each production information handling system image. For instance, customization information may include changes to each image to create unique SIDs or computer names.

Order engine 12 provides a copy of the image and the customization information to analyzing engine 24 for validation of the image and integration of the image and order into the production work flow process. A configuration module 26 analyzes the image to determine the operating system, the base hardware configuration and any misconfigured hardware. For instance, configuration module 26 analyzes the operating system settings and the hardware identifiers that exist in the operating system registry to determine the hardware configuration base that was used to create the image. The base is compared against the registry settings to determine any misconfigurations in which registry settings fail to match the hardware base. Such misconfigurations could result in misconfigured production images that fail to support hardware of production information handling systems. Configuration module 26 provides notice of detected misconfigurations or, alternatively, modifies that image to the proper configuration.

Once configuration module 26 determines the base configuration, capture module 28 captures and stores the base hardware configuration. The captured hardware configuration and the ordered information handling system hardware configuration are compared by verification module 30 to determine the existence of a match or only compatible differences. For instance, if the custom image was generated with an information handling system having a hardware configuration that differs in a substantial way from the ordered information handling system, then verification module 30 provides a message warning of an incompatibility of the ordered image and the production information handling system hardware configuration.

A verified image is prepared for customized production with customization settings module 32 which sets the proper customization level into the image, such as by pushing customization settings determined by customization module 22 into operating system registries. A virus module 34 checks the customized image for virus before a production image is generated. A production module 36 and manufacturing script module 38 then use the verified image and customization level to generate a production image and manufacturing scripts for manufacture of information handling systems. For instance, production module 36 generates a PowerQuest image for use on a burn rack 40 and manufacturing script module 38 generates manufacturing scripts that instructs burn rack 40 to load the image burned to a custom information handling system 42. The production image and manufacturing scripts are downloaded to a server associated with burn rack 40 and called when custom ordered information handling systems 42 are manufactured to fill order 18. Customer orders for various ordered quantity of information handling systems that include the production image are completed as different orders arrive at the factory from the customer that specify the custom image.

Figure 2:
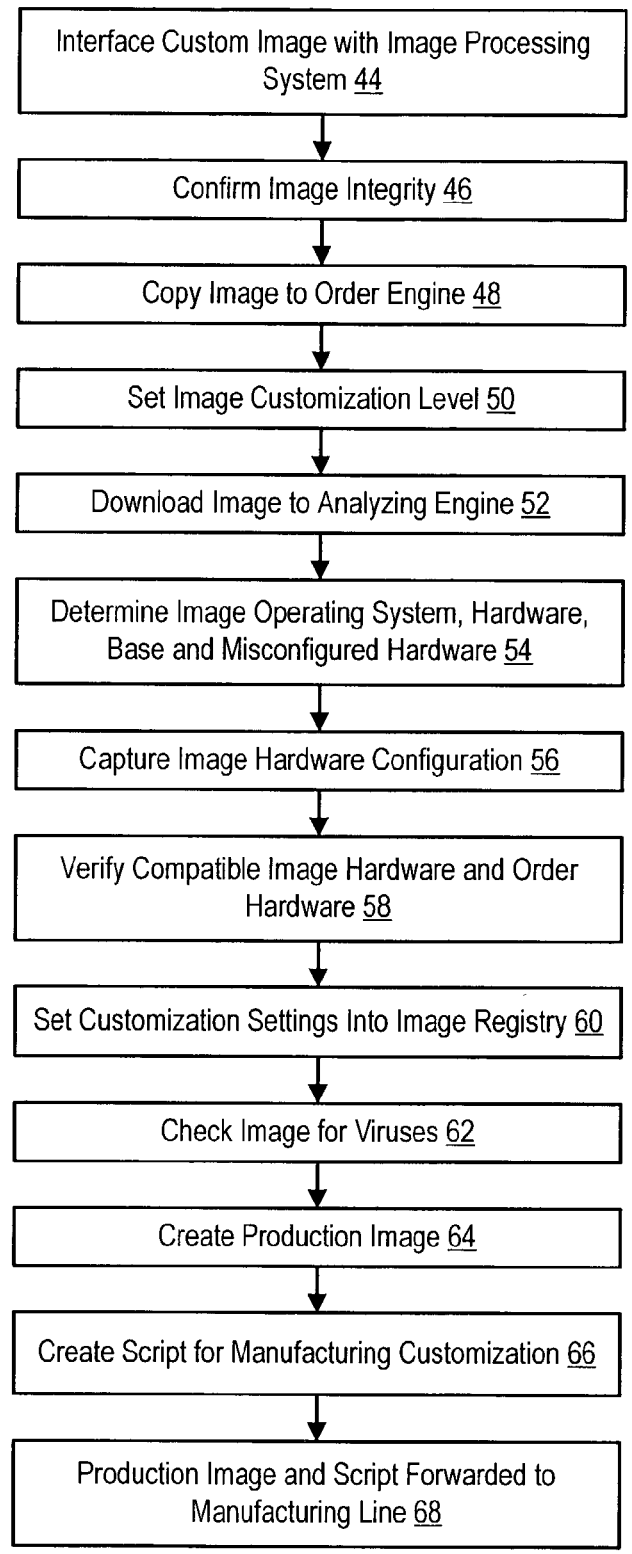
FIG. 2 depicts a flow diagram of a process for manufacturing information handling systems according to custom image orders.

Referring now to FIG. 2, a flow diagram depicts a process for automatic preparation of a custom image into a production image for manufacturing of custom ordered information handling systems. The process begins at step 44 with the custom image interfaced with an image processing system. For instance, a customer creates a custom image on an information handling system that matches the image the customer is ordering and then sends the hard disk drive with the custom image to a manufacturing site. At step 46, the image integrity is confirmed by checking that all portions of the image are included on the hard disk drive and, at step 48, the image is copied to the order engine. At step 50, the customization level is determined from the customer order and, at step 52 the image and customization level are downloaded to the analyzing engine.

At step 54, the analyzing engine determines the operating system of the image and the hardware base used to create the image. Analysis of the operating system settings and drivers allows a determination of whether the image was misconfigured for the hardware of the base system. At step 56, the determined hardware configuration is captured and, at step 58, the captured hardware configuration of the base information handling system is compared with the hardware configurations of information handling systems ordered by the customer. For instance, if the customer ordered hardware configurations that are different from or incompatible with the base hardware configuration, then manufactured information handling systems that include the custom image may fail to operate properly.

At step 60, the verified custom image is customized with customization settings from the customer order by placing customization settings into the image operating system registry. At step 62, the customized image is scanned for viruses and, at step 64 a production image is created from the customized image for use in the manufacturing process. At step 66, scripts for manufacturing customization are created with instructions for customization during the production process, and at step 68 the production image and customization scripts are forwarded to the manufacturing line for use by a burn rack as custom order information handling systems are manufactured.

Although the present invention has been described in detail, it should be understood that various changes, substitutions and alterations can be made hereto without departing from the spirit and scope of the invention as defined by the appended claims.

What is claimed is:

1. A system for manufacturing custom order information handling systems according to a custom image, the system comprising:
    an order engine operable to receive a custom image associated with a custom order for information handling systems to be built according to the custom image;
    an analyzing engine interfaced with the order engine and operable to analyze the image to determine the information handling system hardware configuration that generated the image, to verify that the determined hardware configuration is compatible with the custom order hardware configuration, and to generate a production image for burning onto production information handling systems; and
    a burn rack interfaced with the analyzing engine and operable to copy the production image to ordered information handling systems.

2. The system of claim 1 wherein the order engine further comprises an image integrity module operable to confirm the integrity of a custom image stored on a disk drive.

3. The system of claim 1 wherein the order engine further comprises a customization module operable to set a customization level for the production image from the customer order.

4. The system of claim 3 wherein the analyzing engine further comprises a customization settings module operable to set customization settings into the production image registries.

5. The system of claim 4 wherein the analyzing engine further comprises a manufacturing script module operable to generate a manufacturing script for production image customization at the burn rack.

6. The system of claim 1 wherein the analyzing engine is further operable to analyze the custom image to determine if custom image was misconfigured for the determined hardware configuration.

7. The system of claim 1 wherein the analyzing engine further comprises a virus module operable to scan the image for viruses.

8. A method for automated processing of custom image information handling systems, the method comprising:
    receiving a custom image associated with a custom order for information handling systems to be built according to the custom image;
    analyzing the image to determine the information handling system hardware configuration that generated the image; and
    verifying that the determined hardware configuration is compatible with the hardware configuration of the custom image information handling systems.

9. The method of claim 8 wherein receiving a custom image further comprises interfacing with a hard disk drive associated with an information handling system configured to the custom image.

10. The method of claim 8 further comprising:
    receiving customization information with the custom image; and
    setting a customization level for the custom image based on the customization information.

11. The method of claim 10 wherein setting a customization level further comprises loading customization settings into the image registry.

12. The method of claim 8 wherein analyzing further comprises analyzing the base configuration of the information handling system that generated the image to determine any misconfigurations associated with the custom image.

13. The method of claim 8 further comprising generating a manufacturing customization script to perform customization of information handling systems manufactured with the custom image.

14. An information handling system for custom image processing to manufacture custom information handling systems in a manufacturing work flow process, the information handling system comprising:
    an order engine operable to receive a custom image for burning onto information handling systems to fulfill a custom order; and an analyzing engine interfaced with the order engine and operable to automatically generate a production image and customization script that integrates manufacture of information handling systems ordered with the custom image into the manufacturing work flow process.

15. The information handling system of claim 14 wherein the order engine is further operable to receive the custom image from a hard disk drive, the order engine further comprising an image integrity module for confirming the integrity of the custom image stored on the hard disk drive.

16. The information handling system of claim 14 wherein the analyzing engine further comprises a configuration module operable to determine the base hardware configuration of the information handling system that generated the custom image.

17. The information handling system of claim 16 wherein the configuration module is further operable to compare the image with the base hardware configuration to identify any misconfigurations of the image.

18. The information handling system of claim 16 wherein the analyzing engine further comprises a verification module operable to compare the base hardware configuration for compatibility with a predetermined hardware configuration for ordered information handling systems.

19. The information handling system of claim 16 wherein the analyzing image further comprises a virus module operable to scan the custom image for viruses.

20. The information handling system of claim 19 wherein the analyzing engine is further operable to interface with a burn rack to transfer the production image and customization script to the burn rack for the manufacture of information handling systems with the custom image.

* * * * *

UNITED STATES PATENT AND TRADEMARK OFFICE
CERTIFICATE OF CORRECTION

PATENT NO. : 7,095,908 B2 Page 1 of 1
APPLICATION NO. : 10/292035
DATED : August 22, 2006
INVENTOR(S) : Marc Everett Andrew Jarvis et al.

It is certified that error appears in the above-identified patent and that said Letters Patent is hereby corrected as shown below:

Title page,
Item (75) Inventors:

"Jefferson Watts Raloy" should have been printed --Jefferson Watts Raley--

Signed and Sealed this

Twelfth Day of December, 2006

JON W. DUDAS
*Director of the United States Patent and Trademark Office*